United States Patent
Savin et al.

(10) Patent No.: US 12,261,856 B2
(45) Date of Patent: Mar. 25, 2025

(54) NETWORK SECURITY WITH VPN DETECTION

(71) Applicant: Cujo LLC, Walnut, CA (US)

(72) Inventors: Filip Savin, Vilnius (LT); Leonardas Marozas, Vilnius (LT)

(73) Assignee: Cujo LLC, Covina, CA (US)

( * ) Notice: Subject to any disclaimer, the term of this patent is extended or adjusted under 35 U.S.C. 154(b) by 182 days.

(21) Appl. No.: 17/836,373

(22) Filed: Jun. 9, 2022

(65) Prior Publication Data

US 2023/0403287 A1    Dec. 14, 2023

(51) Int. Cl.
*H04L 29/00*    (2006.01)
*H04L 9/40*    (2022.01)

(52) U.S. Cl.
CPC ...... *H04L 63/1416* (2013.01); *H04L 63/0272* (2013.01)

(58) Field of Classification Search
CPC .............. H04L 63/1416; H04L 63/0272; H04L 63/1408
See application file for complete search history.

(56) References Cited

U.S. PATENT DOCUMENTS

| | | | |
|---|---|---|---|
| 2020/0084265 A1* | 3/2020 | Deen ............... | H04L 67/02 |
| 2023/0254285 A1* | 8/2023 | Henson ............ | H04W 48/16 726/13 |

OTHER PUBLICATIONS

Chaoqun, Liu, et al., "Research on Voip-Over-VPNs Classification and Mitigation," 2022 8th International Confrerence on Information Management (ICIM), DOI: 10.1109/ICIM56520.2022.00004, Mar. 25, 2022 (Year: 2022).*
Extended European Search Report for EP Patent Application No. 23156521.9, mailed Oct. 18, 2023, 10 pages.
Chaoqun, Liu, et al., "Research on Voip-Over-VPNs Classification and Mitigation," 2022 8th International Confrerence on Information Management (ICIM), DOI: 10.1109/ICIM56520.2022.00004, Mar. 25, 2022, 5 pages.

* cited by examiner

*Primary Examiner* — Jeffrey C Pwu
*Assistant Examiner* — Helai Salehi
(74) *Attorney, Agent, or Firm* — Dority & Manning, P.A.

(57) ABSTRACT

A network apparatus maintains a database of a plurality of virtual private network (VPN) protocols and respective VPN providers. A VPN protocol detection process is performed for determining a VPN protocol used by a computing device based on analyzing network traffic data and the database. In response to detecting the VPN protocol detection process failing or detecting a need to identify a respective VPN provider, an endpoint detection process for determining the VPN usage of the computing device is performed. In response to detecting the endpoint detection process failing or detecting a need to identify VPN usage time information, a traffic pattern search process for determining the VPN usage of the computing device is performed. Further action is taken to protect the computing device in response to detecting the VPN usage on the basis of the VPN protocol detection process, the endpoint detection process, and/or the traffic pattern search process.

18 Claims, 3 Drawing Sheets

NETWORK SECURITY WITH VPN DETECTION

TECHNICAL FIELD

The present application relates generally to network security, and specifically to network security methods and apparatuses using VPN detection.

BACKGROUND

In various network security solutions, connections between network devices must often be authorized by an external service, such as a security service provider or the like. The external service may be used to determine whether the user is allowed to access requested contents or whether the connections should be blocked, for example. Proportion of encrypted web traffic is increasing which raises challenges related to security monitoring of the encrypted traffic.

Detecting virtual private network (VPN) traffic presents a problem in many controlled network environments. Since VPN and similar technologies such as encrypted proxies and tunnels can be used to circumvent network security measures and data loss prevention systems with aim of sensitive data exfiltration or providing unauthorized access channels, usage detection (and blocking) of those technologies is crucial to ensuring security of the environment.

It can be desirable to manage network connections without risking security at the same time.

SUMMARY

According to an aspect of the invention there is provided a method.

According to another aspect of the invention, there is provided an apparatus in a computer network system.

According to another aspect of the invention, there is provided a non-transitory computer-readable medium comprising stored program code, the program code comprised of computer-executable instructions that, when executed by a processor device, causes the processor device to operate.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or another attribute, unless otherwise stated herein.

As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
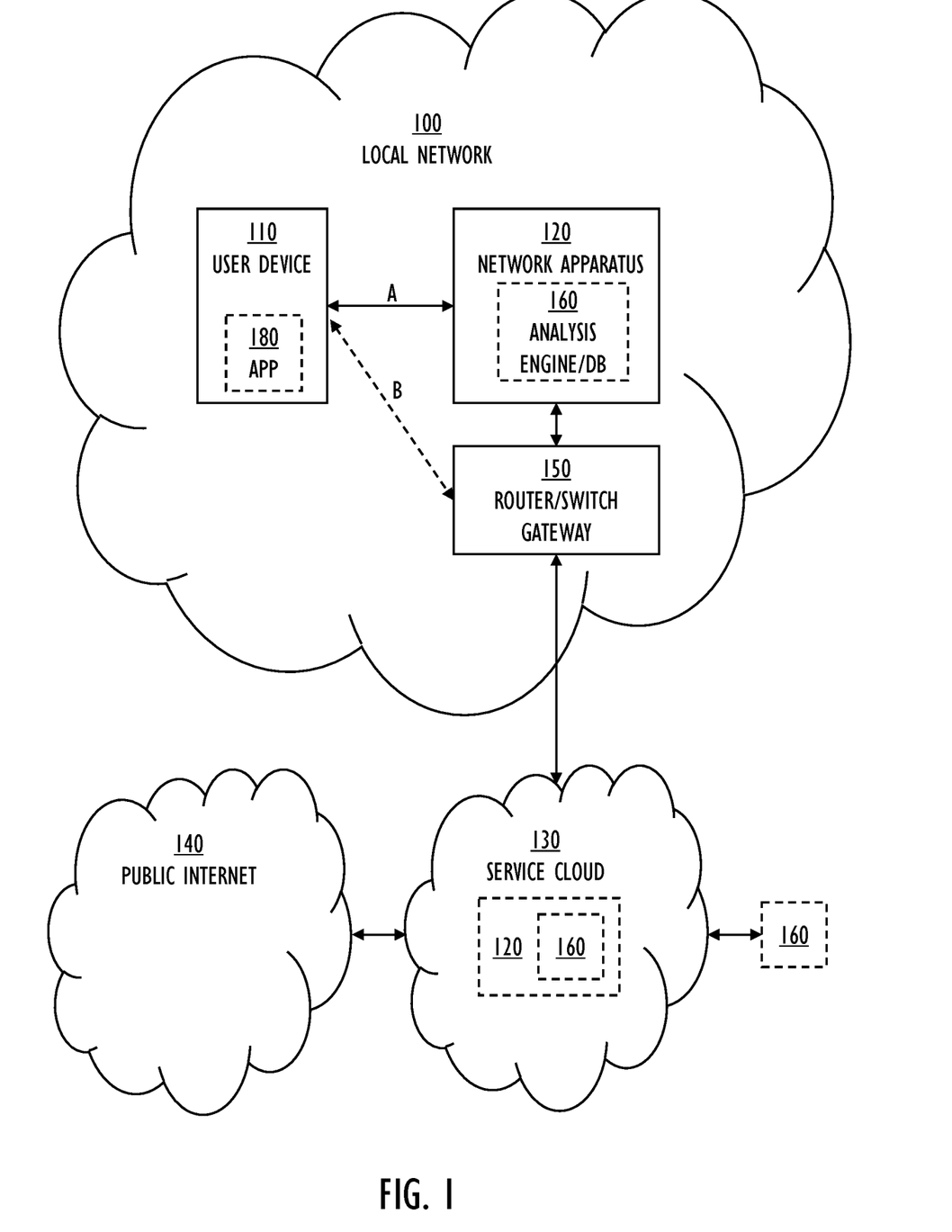
FIG. 1 illustrates an example system environment for a network apparatus in a computer network system.

FIG. 1 illustrates schematically an example of a system environment for a network apparatus 120. The system environment illustrated in FIG. 1 includes a local network 100 that may include one or more computing devices 110 with a client application 180, the network apparatus 120, a local gateway 150, and an analysis engine/database 160. The example system also includes a service cloud 130, such as a network operator's cloud or a security service provider's cloud and the internet 140. The analysis engine 160, such as a web resource analysis engine, may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the client computing device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The client device(s) 110 may also be configured to use the services provided by the service cloud 130 by one or more applications 180 installed on the device(s) 110.

The device 110 may be any computer device having internet browsing capabilities, such a smartphone, laptop, or a tablet. The network apparatus 120 may collect information, e.g., about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signaling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user/client device 110 is a computing device capable of receiving user input as well as transmitting and/or receiving data via the internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the internet 140 or local network 100. In some embodiments, the user device 110 executes an application (e.g., application 180) allowing a user of the user device 110 to interact with other network devices, such as the smart appliances, the network apparatus 120, the gateway 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

Different security and/or parental control solutions are offered to home users, and the use of a virtual private network (VPN) prevents real traffic from analysis by such security solutions. Also, with the trend of rising privacy concerns, it is common for device vendors to equip their devices with VPN-like tunneling technologies, which when enabled, render security related network control mechanisms useless, since real traffic is hidden in the encrypted tunnels.

Some VPN detection products are known but many of them use proprietary detection methods that are mostly based on deep packet inspection. Some other solutions rely on known VPN endpoints, but they are moving targets and thus such solutions are not reliable. Most of encrypted traffic detection solutions work on an agent, i.e., operating system side and the visibility to an endpoint detection is limited. The embodiments of the invention aim to fill the gaps of existing solutions and provide an efficient way of VPN detection and thus enabling security services to client devices and computer networks. The embodiments of the invention enable a solution that can work in scale and is capable of high performance without the need to involve deep learning or build complex neural networks.

An embodiment of the invention enables also returning control of the devices back to home network owners. The users can be informed that a VPN-like technology is in use by a specific network device and, if so decided, that VPN usage can be blocked.

The embodiments of the invention provide a new kind of VPN detection methodology by combining different detection methods into one solution. Each of the detection methods used in an embodiment, namely, a VPN protocol detection, a VPN endpoint usage detection and a VPN traffic pattern detection adds own value to the final result ensuring wide coverage and low false positive rate while keeping required effort minimal.

VPN detection in the most detailed form must answer at least some of the following questions: Has the device used VPN? If yes, for how long? What VPN protocol and which VPN provider was used? To reliably detect VPN usage and answer the questions mentioned, three different processes have to be used: detecting usage of a specific VPN protocol (can also be used for VPN blocking), detecting connection to a specific VPN endpoint (Domain Name System (DNS) and/or Server Name Indication (SNI) Autonomous System Number (ASN)/Internet Protocol (IP) address) of the known VPN providers (can also be used for VPN blocking), and detecting VPN-specific traffic patterns in network flows.

Each of the forementioned processes/methods have downsides when used alone and a maximum coverage for detection can only be achieved by combining all the methods in a single implementation enabling the methods complementing each other. For example, the VPN protocol detection process alone may not easily detect all protocols, a protocol handshake is not indicative of an actual VPN usage and VPN usage duration is unknown. Further, the VPN endpoint detection process suffers from there being lots of VPN providers, full database being hard to collect, endpoints changing often and usage duration being unknown. The process of detecting VPN-specific traffic patterns is computationally most complex, and it may not detect whether the detected traffic patterns are indicative of a device VPN traffic or video streaming, for example. However, combination of these processes enables detecting at least: VPN traffic of known protocols as a result of combination of VPN protocol detection and VPN traffic pattern search, VPN protocol of known provider as a result of combination of VPN protocol detection and VPN endpoint detection, VPN traffic of known provider as a result of combination of VPN traffic pattern search and VPN endpoint detection) and VPN traffic of known protocol of known provider as a result of combination of VPN protocol detection, VPN endpoint detection and VPN traffic pattern search.

Figure 2:
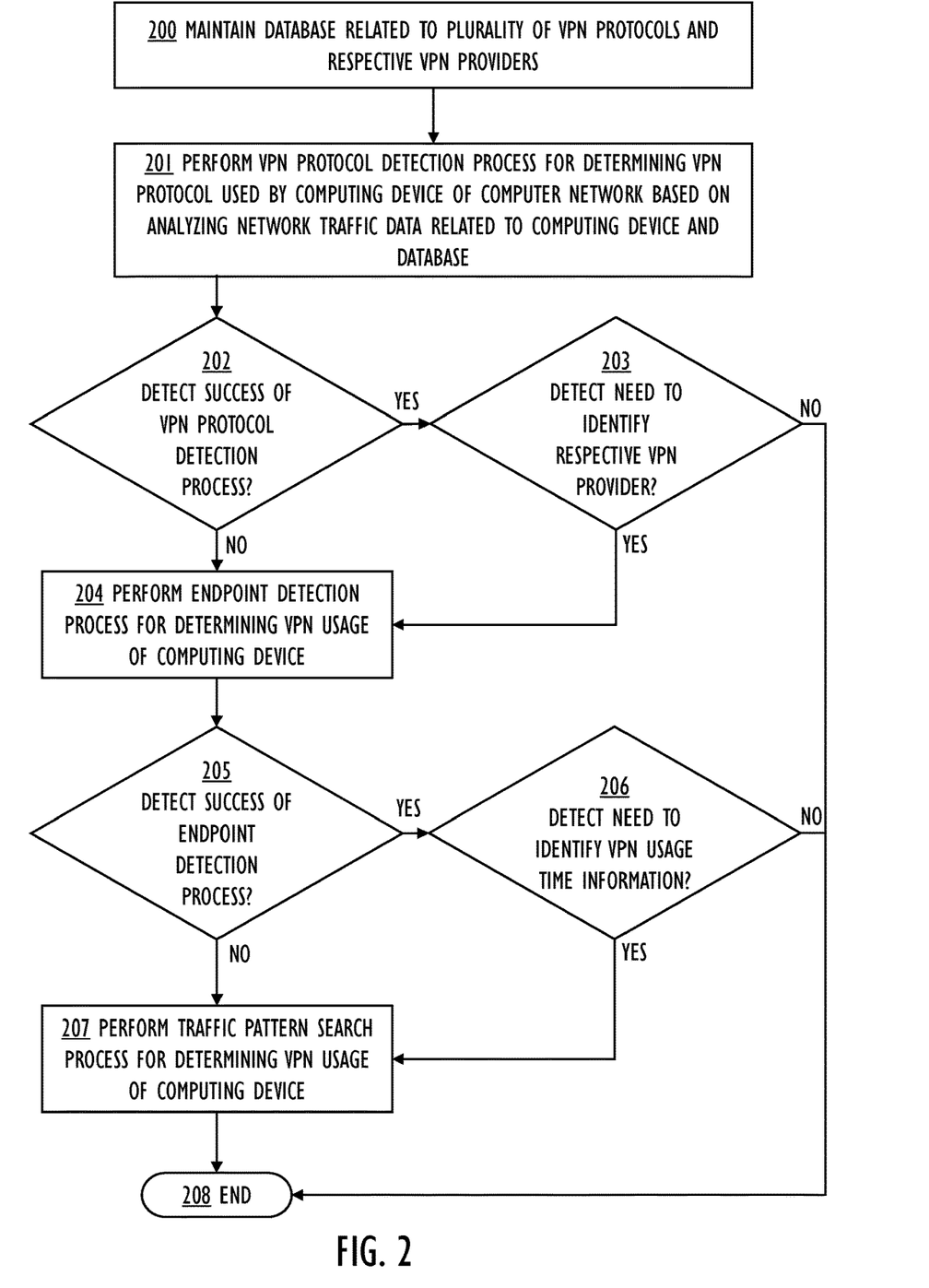
FIG. 2 illustrates a method, according to an embodiment.

FIG. 2 is a flow diagram illustrating an embodiment of a method in a network system.

In 200, a database related to a plurality of virtual private network (VPN) protocols and respective VPN providers thereof is maintained.

There is a large variety of VPN providers and each one of them can provide VPN connectivity using numerous protocols, open or proprietary one. Thus, to make the VPN detection task finite, a list of the most popular VPN providers need to be generated and the protocols they provide need to be analyzed. The endpoint database to store collected information (e.g., from configuration files) for each VPN protocol and VPN provider matrix is required to be created and maintained up to date. Some examples of different VPN protocols used are: Open VPN, Wireguard, Internet Key Exchange version 2 (IKEv2)/Internet Protocol Security (IPSec), Layer Two Tunneling Protocol (L2TP)/IPSec, Point-to-Point Tunneling Protocol (PPTP), Secure Socket Tunneling Protocol (SSTP), and proprietary protocols such as Lightway, Nordlynx, Shadowsocks, Catapult Hydra, and Chameleon.

In 201, a VPN protocol detection process is performed for determining a VPN protocol used by a computing device of a computer network based on analyzing network traffic data related to the computing device and the database.

In 202, if success of the VPN protocol detection process is detected, then 203 is entered where a need to identify respective VPN provider is determined.

In 204, an endpoint detection process is performed for determining VPN usage of the computing device. Thus, in response to an occurrence of one of two events, the endpoint detection process for determining VPN usage of the computing device is performed, wherein the two events comprise a detection of the VPN protocol detection process failing and a detection of a need to identify a respective VPN provider in response to a successfully performed VPN protocol detection process.

In 205, if success of the endpoint detection process is detected, then 206 is entered where a need to identify VPN usage time information is determined.

In 207, a traffic pattern search process is performed for determining VPN usage of the computing device. Thus, in response to an occurrence of one or two further events, a traffic pattern search process for determining the VPN usage of the computing device is performed, wherein the two further events comprise a detection of the endpoint detection process failing and a detection of a need to identify VPN usage time information in response to a successfully performed endpoint detection process.

The method ends in 208 where further actions can be taken to protect the computing device and/or the computer network in response to detecting the VPN usage on the basis of at least one of: the VPN protocol detection process, the endpoint detection process and the traffic pattern search process.

In an embodiment, the VPN protocol detection process is implemented based on one or more of: an open systems interconnection (OSI) level 4 detection, a packet inspection, an open protocol detection for detecting the VPN usage without knowledge of the respective VPN provider, and a proprietary protocol detection for detecting known VPN provider usage.

In an embodiment, the endpoint detection process comprises collecting and maintaining a database of known ingress nodes for each protocol of the VPN providers, and mapping the network traffic data related to the computing device against the database for determining the VPN usage.

In an embodiment, the database of known ingress nodes comprises data relating to one or more of: a VPN provider, a VPN protocol, a host, an internet protocol (IP) address, an autonomous system number (ASN), a transport layer, and a transport port number.

In an embodiment, the traffic pattern search process further comprises analyzing traffic patterns from the computing device based on the network traffic data and, in response to detecting that only a single flow of network communication between the computing device and a remote host is active for a time period exceeding a predetermined threshold, determining that the VPN protocol or another tunneling method is used.

In an embodiment, the single flow of network communication is a transport control protocol/user datagram protocol (TCP/UDP), an encapsulating security payload (ESP) protocol, an authentication header (AH), a generic routing encapsulation (GRE), or another internet protocol (IP) transport communication between the computing device and the remote host.

In an embodiment, the network data is collected by a network traffic hub of a local network.

In an embodiment, the VPN protocol detection process is implemented by using a user-space utility program enabling a configuration of IP packet filter rules of a firewall.

In an embodiment, the method further comprises forwarding the network traffic data collected from the computing device to a service cloud for VPN usage detection on the basis of at least one of: the VPN protocol detection process, the endpoint detection process and the traffic pattern search process.

In an embodiment, the further action to protect the computing device and/or the computer network in response to detecting the VPN usage comprises one or more of: reporting the VPN usage to a user of the computing device and/or a home network owner, blocking the VPN usage of the computing device, and applying other security measures to protect the computer network and/or the computing device.

Figure 3:
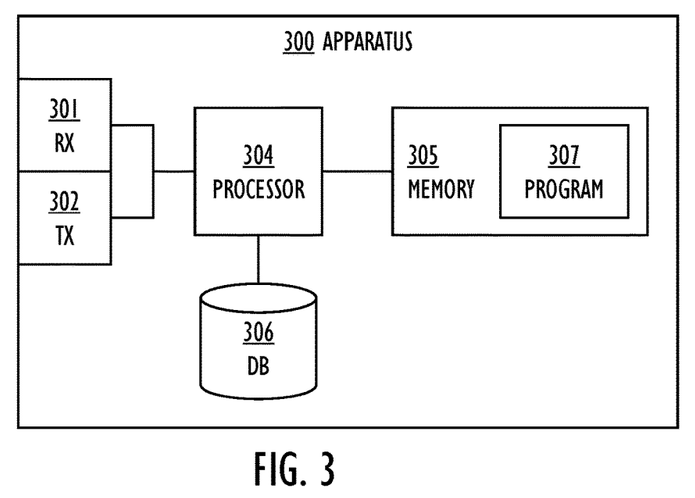
FIG. 3 is a block diagram of an apparatus, according to one embodiment.

Turning now to FIG. 3 that is showing an example of a network apparatus such as a gateway or a cloud service.

A processor 304 is provided that is configured to maintain a database related to a plurality of virtual private network (VPN) protocols and respective VPN providers thereof. A processor is also provided that is configured to perform a VPN protocol detection process for determining the VPN protocol used by a computing device of a computer network based on analyzing network traffic data related to the computing device and the database. A processor is further provided that is configured to perform an endpoint detection process for determining VPN usage of the computing device in response to a detection of the VPN protocol detection process failing or a detection of a need to identify a respective VPN provider in response to a successfully performed VPN protocol detection process. The processor is further configured to perform a traffic pattern search process for determining the VPN usage of the computing device in response to a detection of the endpoint detection process failing or a detection of a need to identify VPN usage time information in response to a successfully performed endpoint detection process. The processor is further configured to take further action to protect the computing device and/or the computer network in response to detecting the VPN usage on the basis of at least one of: the VPN protocol detection process, the endpoint detection process and the traffic pattern search process.

In an embodiment, the processor 304 is further configured to store data such as data related to connection requests, VPN protocols, VPN providers or any related data to the database 306. The database 306 is shown in this example as being located at the apparatus 300, but it will be appreciated that the apparatus 304 may alternatively access a remote database. The database 304 may comprise data collected from user devices or data previously collected.

The apparatus 300 is provided with a receiver 301 that receives the connection requests and responses. A transmitter 302 is also provided for communication with the user device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processors.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all of the functions of the method can be implemented in any apparatus, for example the user device or a server.

Figure 4:
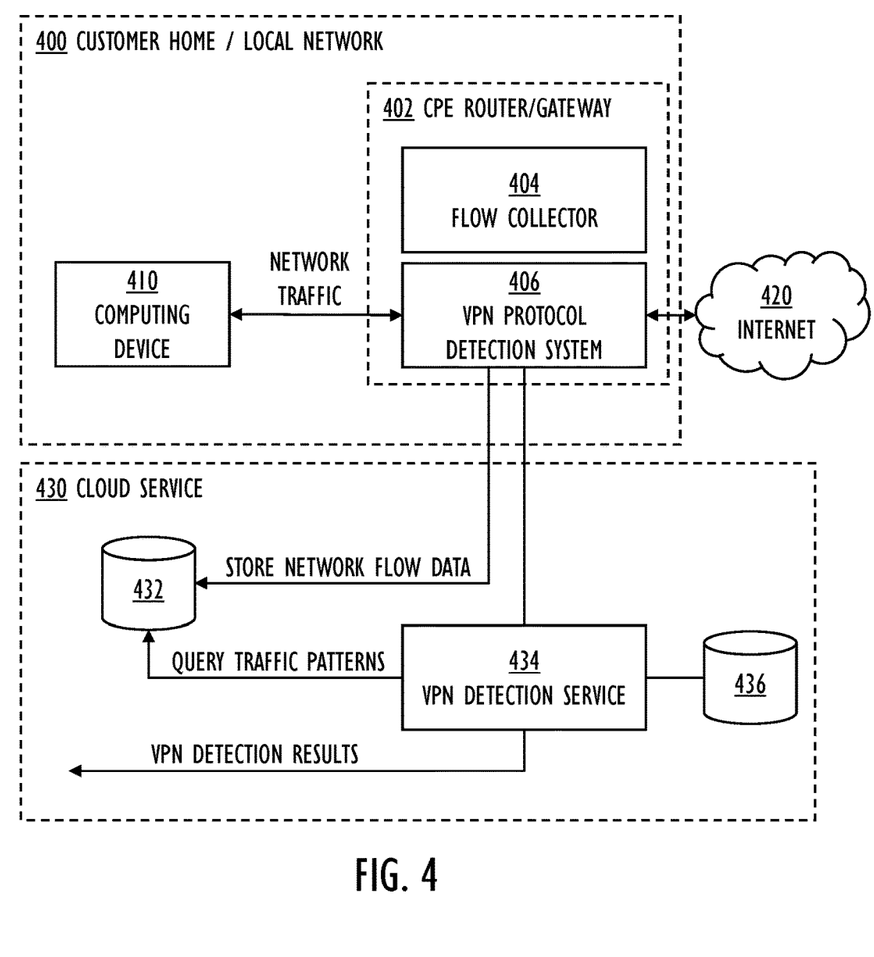
FIG. 4 illustrates another example of a system environment for apparatuses in a computer network system.

FIG. 4 illustrates another example of a system environment for apparatuses in a computer network system. It shows one end-to-end functionality implementation example having a cloud service element 430 in the computer network system. The system environment illustrated in FIG. 4 includes a local network 400 that may include one or more computing devices 410, a customer premises router or a local gateway 402, a flow collector entity 404, and a VPN protocol detection system 406. The local network 400 may communicate with the cloud service entity 430 and the internet 420. The VPN protocol detection system 406 may also include an agent device and it can be implemented by using a user-space utility program enabling configuring IP packet filter rules of a firewall, for example, by using iptables rule with the u32 module or NFLua. NFLua is a netfilter extension targeting advanced application-level filtering using Lua. The cloud service entity 430 in this example comprises databases 432 and 436 and a VPN detection service entity 434. There may also be further analysis engines and/or VPN detection entities in the local network 400, cloud service entity 430 or elsewhere in the computer network thus enabling at least part of the VPN usage detection and analysis being processed in more than one entities. Alternative embodiments may include more, fewer, or different components from those illustrated in FIG. 4, and the functionality of each component may be divided between the components differently from the description below.

In the FIG. 4 example, the flow collector entity 404 collects data related to IP protocols extracted from the network traffic flows from the user computing device 410. The data related to collected network traffic/network flows and any VPN protocol detection messages, such as src (MAC), dst (IP, transport protocol, port, detected VPN port) may be forwarded to the VPN detection service 434 and be stored in the database for storing the network flow data 432. A further database 436 is for collecting and maintaining endpoint related data in the cloud service 430.

The VPN detection service 434 is used for applying and combining the VPN detection processes for example based on data queried from the database 432 for traffic pattern information and data queried from the further database 436 for endpoint related data and data from the VPN protocol detection system 406. When the VPN detection service 434 has a result from the whole VPN detection process, the VPN detection results can be returned to the local network 400 owner and/or forwarded to consumers.

The VPN protocol detection phase of the VPN detection process may be implemented both in a cloud service or in the local network agent, such as in the VPN protocol detection system 406. The VPN protocol detection may consist of two methods: an OSI Level 4 detection (transport protocol/port) and a packet inspection. False negatives are possible when using OSI Level 4 detection if VPN runs on a non-standard port in which case only packet inspection may help. False positives are also possible if some other service runs on VPN default port. False positives are possible when using the packet inspection if bytes at certain offsets occasionally match unrelated traffic. Thus, combining both methods may provide the most reliable result.

Detecting open VPN protocols results in the detection of VPN usage without the knowledge of the VPN provider. Thus, if an open protocol detection is combined with an endpoint detection process, then certain VPN providers can be detected, e.g., cases when standard protocols use non-standard ports. Table 1 shows examples of open protocols, their default transport/ports and packet inspection data.

TABLE 1

Example open protocols and default transport/ports

| Protocol | Default transport/port | Packet inspection |
|---|---|---|
| OpenVPN | UDP/1194 or TCP443 | Handshake UDP:<br>1 CLI->SRV, pkt 1: payload [0]==0x38<br>2 SRV->CLI, pkt 1: payload [0]==0x40<br>3 CLI->SRV, pkt 2: payload [0]==0x28<br>Handshake TCP:<br>1 CLI->SRV, pkt 1: payload [2]==0x38<br>2 SRV->CLI, pkt 1: payload [2]==0x40<br>3 CLI->SRV, pkt 2: payload [2]==0x28 |
| Wireguard | UDP/51820 | Handshake:<br>1 CLI->SRV, pkt 1: payload.size==148 &&<br>payload[0] == 0x01000000<br>2 SRV->CLI, pkt 1: payload.size== 92 &&<br>payload[0] == 0x02000000 |
| IKEv2/IPSec* | UDP/500,4500-control ESP(50)-data | Handshake UDP/500->UDP/500<br>1 CLI->SRV pkt 1: payload[8] ==<br>0x0000000000000000021202208<br>2 SRV->CLI pkt 1: payload[16] == 0x21202220 |
| L2TP/IPSec* | UDP/500,4500-control ESP(50), AH(51)-data | Handshake UDP/500->UDP/500<br>1 CLI->SRV pkt 1: payload[8] ==<br>0x00000000000000001100200<br>2 SRV->CLI pkt 1: payload [16] == 0x01100200 |
| PPTP* | TCP/1723-control GRE(47)-data | Handshake:<br>1 CLI->SRV pkt 1: payload[2] ==<br>0x00011a2b3c4d0001<br>2 SRV->CLI pkt 1: payload[2] == 0x00011a2b3c4d002 |
| SSTP | TCP/443 | Same as TLS (encapsulates SSTP for control and PPP for data) |

*These protocols are known to be used only on default transports

Detecting proprietary protocols results in the detection of known VPN provider usage. If the proprietary protocol detection method is combined with endpoint detection process, then reliability of the results can be increased. Table 2 shows examples of proprietary protocols, their default transport/ports and packet inspection data.

TABLE 2

Example proprietary protocols and default transport/ports

| Protocol | Default transport/port | Packet inspection |
|---|---|---|
| Lightway | UDP/any TCP/443 | UDP handshake:<br>1 CLI->SRV, pkt 1: payload, size == 144 &&<br>payload[0] == 0x486501010000<br>2 SRV->CLI, pkt 1: payload.size == 76 &&<br>payload[0] == 0x4865010100000<br>TCP handshake same as TLS (without SNI) - possible ClientHello fingerprinting |
| NordLynx | UDP/51820 | Same as Wireguard |
| Shadowsocks | TCP/any or UDP/any | Impossible, because fully encrypted SOCKS5 tunnel (made to get through GFWoC) |
| Catapult Hydra | TCP/any | Seems to be TLS-based |
| Chameleon | TCP/any or UDP/any | OpenVPN scrambled to prevent detection by DPI |

Endpoint detection phase of the VPN detection process involves the process of collecting and maintaining a database of known ingress nodes for each protocol of every VPN provider. An example of the database 436 record format is as follows: Provider, VPN Protocol, Host, IP, ASN, Transport, Port.

On the cloud side, data from agent netflows/network traffic flows (or specially created VPN traffic traps) in the example format of: Host, IP, ASN, Transport, Port can be mapped against the database to determine VPN usage including provider and VPN protocol as an extension or additional microservice an agent service, for example.

Related to the traffic pattern search phase of the VPN detection process, when VPN is used, then all network traffic is tunneled to a single ingress node. A single connection is often used and always single transport. Thus, observing traffic pattern from the client device when only a single flow is active for a long period of time (predetermined period of time can be set) would mean the probability of VPN usage or another tunneling method like SOCKS. Split-VPN setups are more complex but still possible to detect by using the proposed method. Flow here can be TCP/UDP or another IP transport like encapsulating security payload (ESP), authentication header (AH) or generic routing encapsulation (GRE) communications between the client device and a remote host.

Each VPN detection process phase of the VPN detection process has different computational complexity involved in the processes in the ascending order of: a protocol detection, an endpoint detection, and traffic pattern search processes. Thus, combining the processes by using the proposed algorithm shown in FIG. 2 is effective and enables also taking into account the level of VPN detection that is needed. For example, if the name of the VPN provider is required, then the process continues to perform an endpoint detection process, or, if VPN usage time is needed, then traffic pattern search process can be performed. Also in the proposed VPN detection algorithm, the output of the traffic pattern detection phase may be analyzed for possible improvements for endpoint or protocol detection phases to lower usage of the most computationally complex phases in the future. Each of the VPN detection processes, the protocol detection, the endpoint detection, and the traffic pattern detection, adds its own value in the whole VPN usage detection.

The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases, or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises one or more codes for performing the process steps according to the described example embodiments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
maintaining a database related to a plurality of virtual private network (VPN) protocols and respective VPN providers thereof;
performing a VPN protocol detection process for determining a VPN protocol used by a computing device of a computer network based on analyzing network traffic data related to the computing device and the database;
in response to an occurrence of one of two events, performing an endpoint detection process for determining VPN usage of the computing device, wherein the two events comprise a detection of the VPN protocol detection process failing and a detection of a need to identify a respective VPN provider in response to a successfully performed VPN protocol detection process, wherein the endpoint detection process comprises maintaining a known ingress node database of known ingress nodes for each VPN protocol of the respective VPN providers, and mapping the network traffic data related to the computing device against the known ingress node database for determining the VPN usage;
subsequent to performing the endpoint detection process for determining the VPN usage of the computing device, in response to an occurrence of one or two further events, performing a traffic pattern search process for determining the VPN usage of the computing device, wherein the two further events comprise a detection of the endpoint detection process failing and a detection of a need to identify VPN usage time information in response to a successfully performed endpoint detection process; and
taking further action to protect the computing device and/or the computer network in response to detecting the VPN usage on the basis of at least one of: the VPN protocol detection process, the endpoint detection process, and the traffic pattern search process.

2. The method according to claim 1, wherein the VPN protocol detection process is implemented based on one or more of: an open systems interconnection (OSI) level 4 detection, a packet inspection, an open protocol detection for detecting the VPN usage without knowledge of the respective VPN provider, and a proprietary protocol detection for detecting known VPN provider usage.

3. The method according to claim 1, wherein the known ingress node database of known ingress nodes comprises data relating to one or more of: the VPN provider, the VPN protocol, a host, an internet protocol (IP) address, an autonomous system number (ASN), a transport layer, and a transport port number.

4. The method according to claim 1, wherein the traffic pattern search process further comprises:
analyzing traffic patterns from the computing device based on the network traffic data, and
in response to detecting that only a single flow of network communication between the computing device and a remote host is active for a time period exceeding a predetermined threshold, determining that the VPN protocol or another tunneling method is used.

5. The method according to claim 1, wherein the network traffic data is collected by a network traffic hub of a local network.

6. The method according to claim 1, wherein the VPN protocol detection process is implemented by using a user-space utility program enabling a configuration of IP packet filter rules of a firewall.

7. The method according to claim 1, further comprising forwarding the network traffic data collected from the computing device to a service cloud for VPN usage detection on the basis of at least one of: the VPN protocol detection process, the endpoint detection process, and the traffic pattern search process.

8. The method according to claim 1, wherein the further action to protect the computing device and/or the computer network in response to detecting the VPN usage comprises one or more of: reporting the VPN usage to a user of the computing device and/or a home network owner, blocking the VPN usage of the computing device, and applying other security measures to protect the computer network and/or the computing device.

9. The method according to claim 4, wherein the single flow of network communication is a transport control protocol/user datagram protocol (TCP/UDP), an encapsulating security payload (ESP) protocol, an authentication header (AH), a generic routing encapsulation (GRE), or another internet protocol (IP) transport communication between the computing device and the remote host.

10. An apparatus in a computer network system comprising:
  one or more processor devices, the one or more processor devices configured to:
  maintain a database related to a plurality of virtual private network (VPN) protocols and respective VPN providers thereof;
  perform a VPN protocol detection process for determining a VPN protocol used by a computing device of a computer network based on analyzing network traffic data related to the computing device and the database;
  in response to an occurrence of one of two events, perform an endpoint detection process for determining VPN usage of the computing device, wherein the two events comprise a detection of the VPN protocol detection process failing and a detection of a need to identify a respective VPN provider in response to a successfully performed VPN protocol detection process, wherein the endpoint detection process comprises maintaining a known ingress node database of known ingress nodes for each VPN protocol of the respective VPN providers, and mapping the network traffic data related to the computing device against the known ingress node database for determining the VPN usage;
  subsequent to performing the endpoint detection process for determining the VPN usage of the computing device, in response to an occurrence of one or two further events, perform a traffic pattern search process for determining the VPN usage of the computing device, wherein the two further events comprise a detection of the endpoint detection process failing and a detection of a need to identify VPN usage time information in response to a successfully performed endpoint detection process; and
  take further action to protect the computing device and/or the computer network in response to detecting the VPN usage on the basis of at least one of: the VPN protocol detection process, the endpoint detection process, and the traffic pattern search process.

11. The apparatus according to claim 10, the one or more processor devices being further configured to implement the VPN protocol detection process based on one or more of: an open systems interconnection (OSI) level 4 detection, a packet inspection, an open protocol detection for detecting the VPN usage without knowledge of the respective VPN provider, and a proprietary protocol detection for detecting known VPN provider usage.

12. The apparatus according to claim 10, wherein to perform the traffic pattern search process, the one or more processor devices are further configured to:
  analyze traffic patterns from the computing device based on the network traffic data; and
  in response to detecting that only a single flow of network communication between the computing device and a remote host is active for a time period exceeding a predetermined threshold, determine that the VPN protocol or another tunneling method is used.

13. The apparatus according to claim 10, the one or more processor devices being further configured to implement the VPN protocol detection process by using a user-space utility program enabling a configuration of IP packet filter rules of a firewall.

14. The apparatus according to claim 10, the one or more processor devices being further configured to forward the network traffic data collected from the computing device to a service cloud for VPN usage detection on the basis of at least one of: the VPN protocol detection process, the endpoint detection process, and the traffic pattern search process.

15. The apparatus according to claim 10, the one or more processor devices being further configured to implement the further action to protect the computing device and/or the computer network in response to detecting the VPN usage by one or more of: reporting the VPN usage to a user of the computing device and/or a home network owner of the VPN usage, blocking the VPN usage of the computing device, and applying other security measures to protect the computer network and/or the computing device.

16. The apparatus according to claim 11, wherein the known ingress node database of known ingress nodes comprises data relating to one or more of: the VPN provider, the VPN protocol, a host, an internet protocol (IP) address, an autonomous system number (ASN), a transport layer, and a transport port number.

17. The apparatus according to claim 12, wherein the single flow of network communication is a transport control protocol/user datagram protocol (TCP/UDP), an encapsulating security payload (ESP) protocol, an authentication header (AH), a generic routing encapsulation (GRE), or another internet protocol (IP) transport communication between the computing device and the remote host.

18. A non-transitory computer-readable medium comprising stored program code, the program code comprised of computer-executable instructions that, when executed by a processor device, causes the processor device to:
  maintain a database related to a plurality of virtual private network (VPN) protocols and respective VPN providers thereof;
  perform a VPN protocol detection process for determining a VPN protocol used by a computing device of a computer network based on analyzing network traffic data related to the computing device and the database;
  in response to an occurrence of one of two events, perform an endpoint detection process for determining VPN usage of the computing device, wherein the two events comprise a detection of the VPN protocol detection process failing and a detection of a need to identify a respective VPN provider in response to a successfully performed VPN protocol detection process, wherein the endpoint detection process comprises maintaining a known ingress node database of known ingress nodes for each VPN protocol of the respective VPN providers, and mapping the network traffic data related to the computing device against the known ingress node database for determining the VPN usage;
  subsequent to performing the endpoint detection process for determining the VPN usage of the computing device, in response to an occurrence of one or two further events, perform a traffic pattern search process for determining the VPN usage of the computing device, wherein the two further events comprise a detection of the endpoint detection process failing and a detection of a need to identify VPN usage time information in response to a successfully performed endpoint detection process; and take further action to protect the computing device and/or the computer network in response to detecting the VPN usage on the basis of at least one of: the VPN protocol detection process, the endpoint detection process, and the traffic pattern search process.

\* \* \* \* \*